US012698022B2

(12) United States Patent
Menlarayzz

(10) Patent No.: US 12,698,022 B2
(45) Date of Patent: Aug. 4, 2026

(54) GROCERY CART DIVIDER

(71) Applicant: Mendek Menlarayzz, Statesville, NC (US)

(72) Inventor: Mendek Menlarayzz, Statesville, NC (US)

( * ) Notice: Subject to any disclaimer, the term of this patent is extended or adjusted under 35 U.S.C. 154(b) by 289 days.

(21) Appl. No.: 18/541,392

(22) Filed: Dec. 15, 2023

(65) Prior Publication Data

US 2025/0196904 A1    Jun. 19, 2025

(51) Int. Cl.
*B62B 5/00* (2006.01)

(52) U.S. Cl.
CPC ...................................... *B62B 5/00* (2013.01)

(58) Field of Classification Search
CPC ..... B62B 3/1412; B62B 3/142; B62B 3/1444; B62B 3/1464; B62B 3/1468; B62B 3/1472
See application file for complete search history.

(56) References Cited

U.S. PATENT DOCUMENTS

| | | | | |
|---|---|---|---|---|
| 4,492,332 | A | * | 1/1985 | Collins .............. B65D 5/48038 |
| | | | | 229/120.36 |
| 4,548,350 | A | | 10/1985 | Engle et al. |
| 4,964,528 | A | | 10/1990 | Wagoner |
| 5,052,580 | A | * | 10/1991 | Khoury ..................... B60R 7/02 |
| | | | | 220/551 |
| 5,265,893 | A | | 11/1993 | Ettlin |
| 5,597,193 | A | * | 1/1997 | Conner ..................... B60P 7/14 |
| | | | | 410/112 |
| 5,772,058 | A | * | 6/1998 | Staesche .................. B60R 7/02 |
| | | | | 220/531 |
| 5,918,798 | A | * | 7/1999 | Frahm .................. B65D 5/3614 |
| | | | | 229/117.07 |
| 6,913,386 | B2 | | 7/2005 | Maher et al. |
| 7,270,338 | B1 | * | 9/2007 | Edgar ................... B62B 3/1464 |
| | | | | 280/33.992 |
| 7,837,205 | B2 | | 11/2010 | Simard |
| 10,232,867 | B1 | | 3/2019 | Jones et al. |
| 10,383,414 | B2 | | 8/2019 | Tan |
| D874,779 | S | | 2/2020 | Wieth et al. |
| 10,850,758 | B1 | | 12/2020 | Griffith |
| 10,858,026 | B2 | | 12/2020 | Robinson et al. |
| 11,590,995 | B2 | | 2/2023 | Gardner |
| 2006/0207989 | A1 | | 9/2006 | Ritchie et al. |
| 2015/0076199 | A1 | * | 3/2015 | Granvle ................ B62B 3/1464 |
| | | | | 224/411 |
| 2016/0375921 | A1 | * | 12/2016 | Strawser ............... B62B 3/1464 |
| | | | | 224/411 |
| 2020/0047787 | A1 | * | 2/2020 | Bacallao .................. B62B 5/00 |
| 2022/0126899 | A1 | | 4/2022 | Moore et al. |

* cited by examiner

*Primary Examiner* — Erez Gurari

(74) *Attorney, Agent, or Firm* — Dunlap Bennett & Ludwig PLLC; Anna L. Kinney

(57) ABSTRACT

A cart divider includes a main placard and one or more side placards. The main placard may be configured to divide an internal portion of a cart in a longitudinal direction. The side placards may be configured to divide the internal portion of the cart in a lateral direction. The side placards may be disposed at a midpoint of the main placard. The main placard and the side placards may be configured to divide the internal portion of the cart into four quadrants.

9 Claims, 4 Drawing Sheets

GROCERY CART DIVIDER

BACKGROUND OF THE INVENTION

Field of the Invention

The present invention relates to a grocery cart divider for a grocery cart.

Description of the Related Art

Grocery carts help users to collect goods or carry items the users desire to buy. Typically, a grocery cart includes a single big basket in which the users collect the goods to purchase. Sometimes, a user may face difficulty in keeping the items separate when shopping for multiple orders in a grocery store, which may cause inconvenience to the user and may be undesirable.

Thus, there exists a need of a device that enables the users to keep the items separate in the grocery cart.

SUMMARY OF THE INVENTION

The following presents a simplified summary of the present disclosure in a simplified form as a prelude to the more detailed description that is presented herein.

In accordance with embodiments of the invention, there is provided a cart divider that may include a main placard and one or more side placards. The main placard may be configured to divide an internal portion of a cart in a longitudinal direction. The side placards may be configured to divide the internal portion of the cart in a lateral direction. The side placards may be disposed at a midpoint of the main placard. The main placard and the side placards may be configured to divide the internal portion of the cart into four quadrants.

In some aspects, the cart divider may be configured to move between an operational configuration and a non-operational configuration. In the operational configuration, planes of the side placards may be perpendicular to a plane of the main placard. In the non-operational configuration, planes of the side placards may be parallel to the plane of the main placard. In further aspects, in the operational configuration, the plane of the main placard may be perpendicular to a plane of a base of the cart. In the non-operational configuration, the plane of the main placard may be parallel to the plane of the base of the cart.

The cart divider may include an anchor strip configured to attach the main placard and the side placards to the cart. The anchor strip may be located at a bottom portion of the main placard. The cart divider may include installation clips configured to attach the cart divider to the cart.

The present disclosure discloses a grocery cart divider that divides a grocery cart with minimum effort. In addition, the grocery cart divider is configured to move between the operational configuration and the non-operational configuration. In the non-operational configuration, the grocery cart divider may be configured to fold, which may enable easy storage of the cart divider when the cart divider is not in use. In addition, the grocery cart divider is easy to use.

These and other features, aspects, and advantages of the present invention will become better understood with reference to the following description and appended claims.

BRIEF DESCRIPTION OF THE DRAWINGS

Illustrative embodiments of the present invention are described herein with reference to the accompanying drawings, in which.

DETAILED DESCRIPTION OF INVENTION

Figures 1, 2:
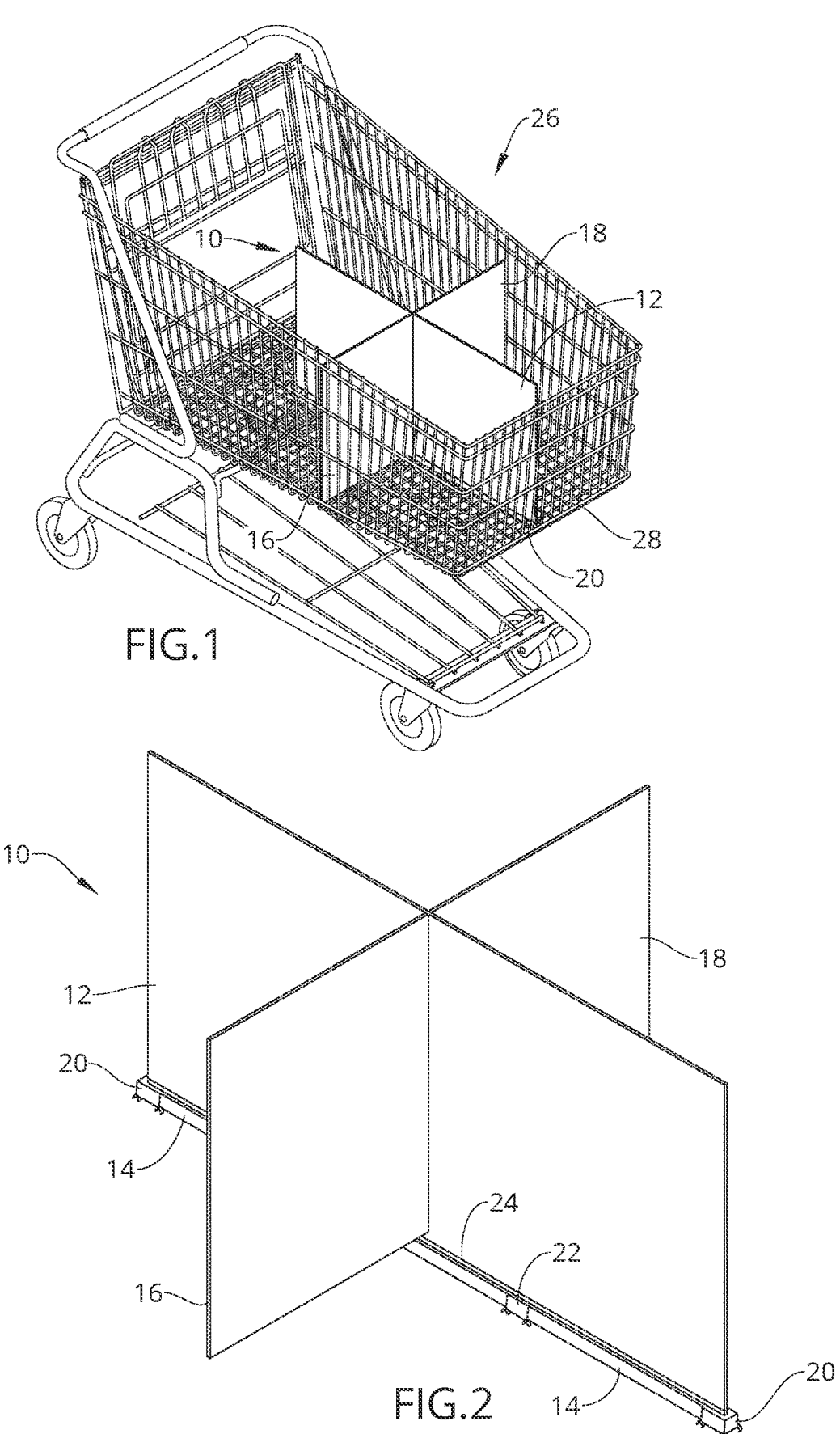
FIG. 1 is a perspective view depicting an example grocery cart divider in accordance with the present disclosure, shown in use.
FIG. 2 is another perspective view depicting the grocery cart divider of FIG. 1 in a use position in accordance with the present disclosure.

For a further understanding of the nature and function of the embodiments, reference should be made to the following detailed description. Detailed descriptions of the embodiments are provided herein, as well as, the best mode of carrying out and employing the present invention. It will be readily appreciated that the embodiments are well adapted to carry out and obtain the ends and features mentioned as well as those inherent herein. It is to be understood, however, that the present invention may be embodied in various forms. Therefore, persons of ordinary skill in the art will realize that the following disclosure is illustrative only and not in any way limiting, as the specific details disclosed herein provide a basis for the claims and a representative basis for teaching to employ the present invention in virtually any appropriately detailed system, structure or manner. It should be understood that the devices, materials, methods, procedures, and techniques described herein are presently representative of various embodiments. Other embodiments of the disclosure will readily suggest themselves to such skilled persons having the benefit of this disclosure.

Reference will now be made in detail to the present preferred embodiments of the invention, examples of which are illustrated in the accompanying drawings. Wherever possible, the same reference numerals are used in the drawings and the description to refer to the same or like parts.

FIG. 1 depicts an example grocery cart divider assembly 10 in accordance with the present disclosure. FIG. 1 will be explained in conjunction with FIGS. 2-5. The grocery cart divider 10 may be configured to divide an internal portion of a grocery cart (e.g., a grocery or shopping cart 26 having cross bars 28 shown in FIG. 1) into two or more parts. In some aspects, the grocery cart divider 10 may be configured to create four quadrants within the grocery cart 26 to enable a user to store items separately in different sections/portions/quadrants.

Figures 3, 4, 5:
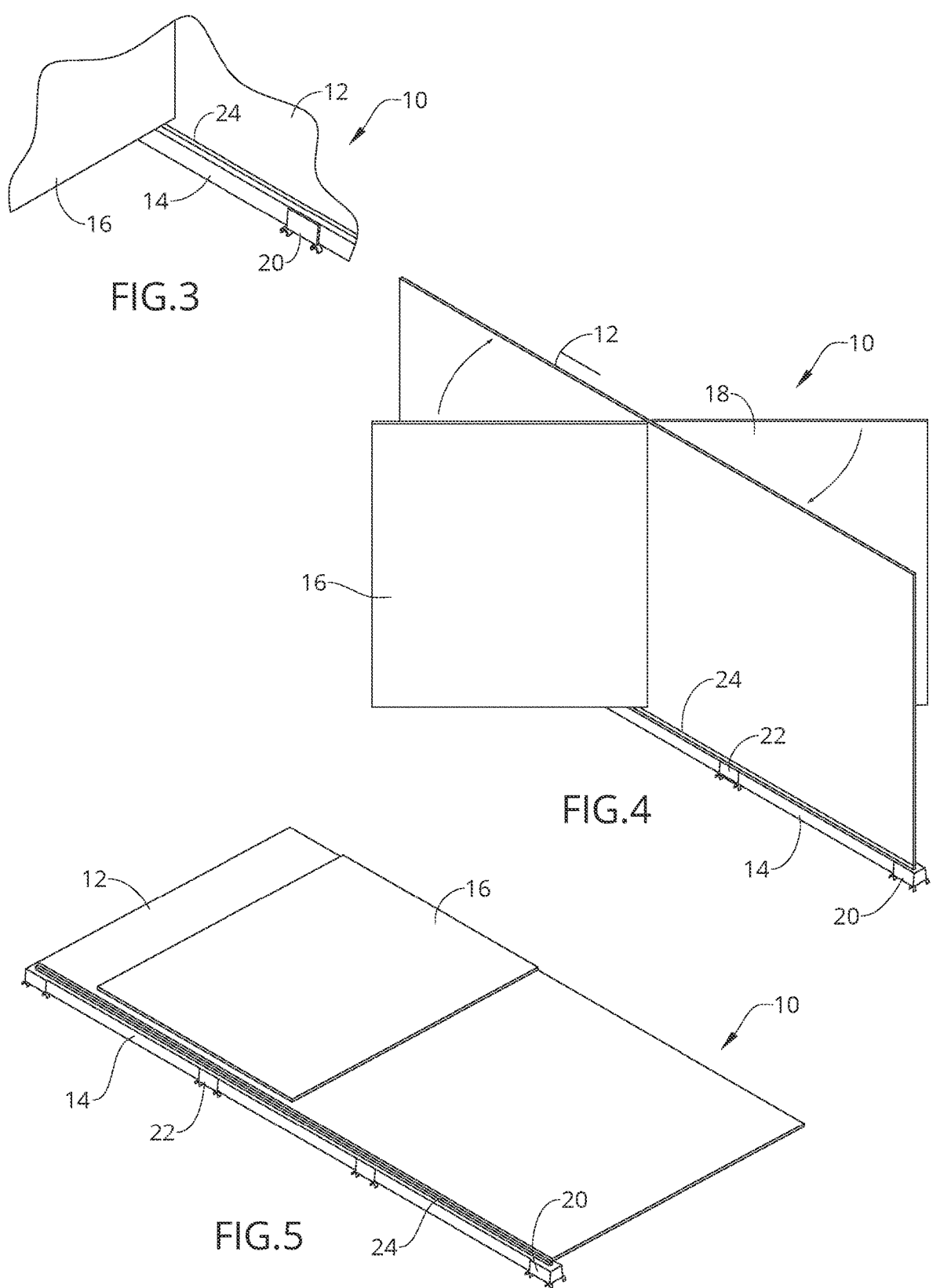
FIG. 3 is a detail view thereof.
FIG. 4 is a top perspective view of the grocery cart divider, illustrating a transition from a use position to a folded position.
FIG. 5 is another top perspective view thereof, shown in a folded position.
Figures 6, 7:
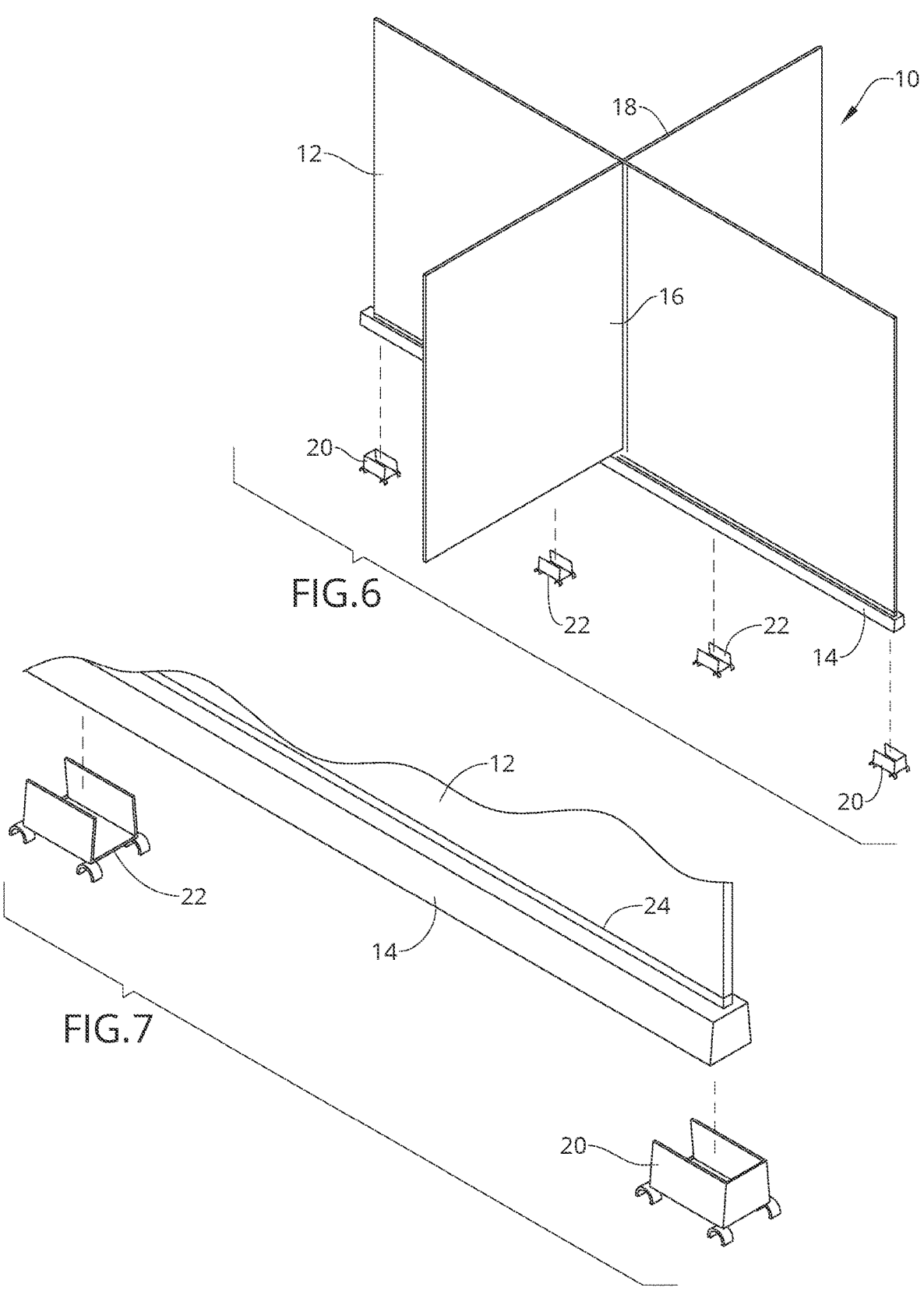
FIG. 6 is an exploded view thereof.
FIG. 7 is a detail view thereof.
Figure 8:
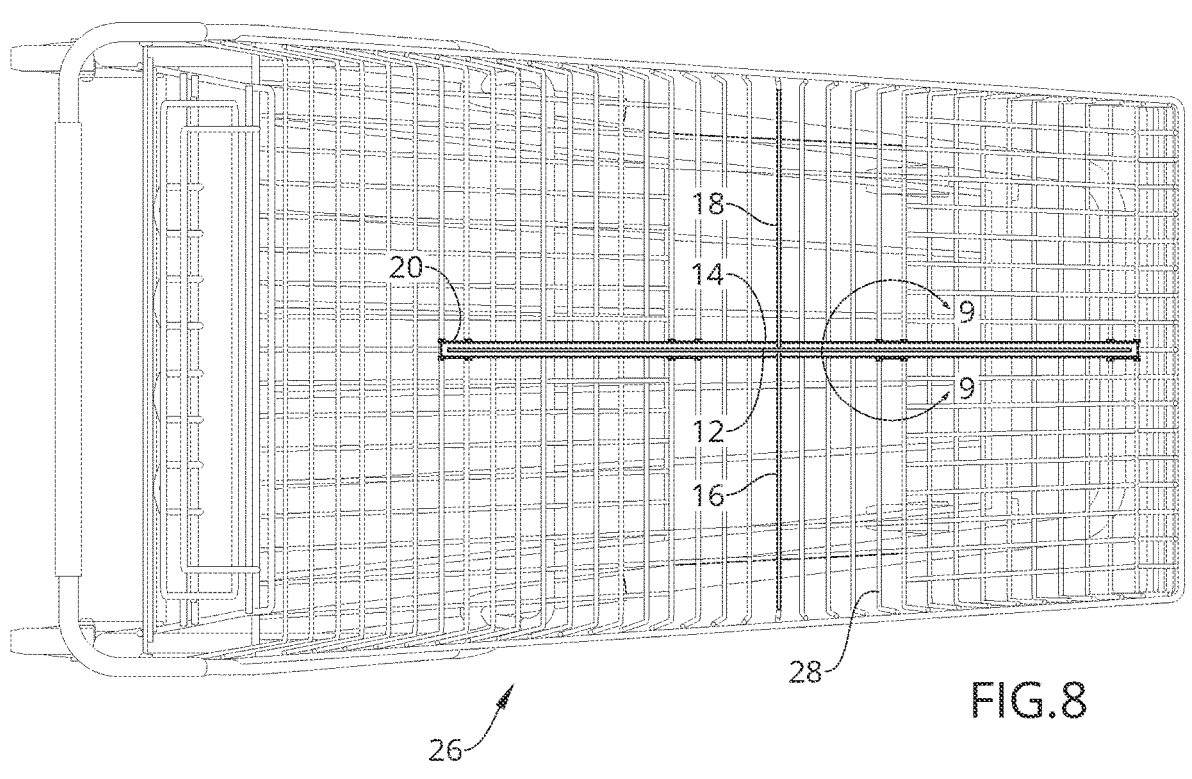
FIG. 8 is a top plan view of the grocery cart divider, shown in use.
Figure 9:
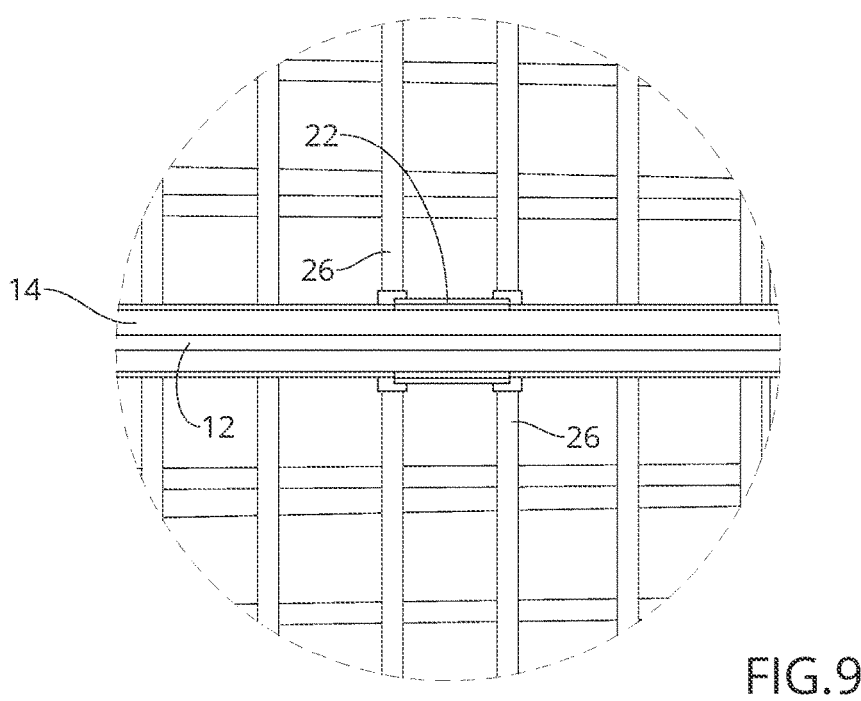
FIG. 9 is a detail view thereof, taken from line 9-9 in FIG. 8.

The grocery cart divider 10 may be configured to move between an operational configuration (or an unfolded position/configuration, see FIG. 2) and a non-operational configuration (or a folded position/configuration or non-use state, see FIG. 5). When the grocery cart divider 10 may be in the operational configuration, the grocery cart divider 10 may divide the internal portion of the grocery cart 26 into the four quadrants to enable the user to store the goods/items separately in each quadrant. When the grocery cart divider 10 may be in the non-operational configuration, the grocery cart divider 10 may be in the folded state in the grocery cart 26. In such scenarios, the user may keep the goods in a common space of the grocery cart 26 (i.e., without dividing the internal portion of the grocery cart 26).

The grocery cart divider 10 may include a main placard or center panel 12 and side placards or side panels 16, 18. In some aspects, the main placard 12 and the side placards 16, 18 may be rectangular boards that may be placed in the internal portion of the grocery cart 26 to create four quadrants in the grocery cart 26 (e.g., in the operational configuration). The main placard 12 may be configured to divide the grocery cart 26 longitudinally, and the side placards 16,18 may be configured to divide the grocery cart 26 laterally. Stated another way, the side placards 16, 18 may be disposed perpendicular to the main placard 12. Thus, in the operational configuration, a plane of the main placard 12 may be perpendicular to planes of the side placards 16, 18.

In some aspects, the side placards 16, 18 may be disposed at a midpoint of the main placard 12, from both the sides of the main placard 12. For example, a first side placard 16 may be disposed at a midpoint of a left side of the main placard 12, and a second side placard 18 may be disposed at a midpoint of a right side of the main placard 12. Thus, in the operational configuration, the main placard 12 and the side placards 16, 18 may be placed such that the main placard 12 and the side placards 16, 18 may form a "cross" creating four quadrants within the grocery cart 26. In some aspects, the first side placard 16 and the second side placard 18 may be placed separately on the two opposite surfaces of the main placard 12. Alternatively, the first side placard 16 and the second side placard 18 may be a single placard that may be disposed in an indentation (or a deep notch) located at a middle portion of the main placard 12. In some aspects, the deep notch may extend through the entire width of the main placard 12. Alternatively, the deep notch may extend through a substantial portion of the width of the main placard 12. In some embodiments, the side placards 16, 18 may be joined with a deep notch therebetween.

The dimensions of the main placard 12 and the side placards 16, 18 may be same or different. In some aspects, the length of the main placard 12 may be greater than the length of the side placards 16, 18. For example, the length of the main placard 12 may be twice the length of the side placards 16, 18. In further aspects, the width of the main placard 12 may be similar to or greater than the width of the side placards 16, 18. In an exemplary embodiment, the main placard 12 may be about 26 inches wide, about 13 inches in height, and about ⅛ inches in thickness.

In some aspects, the side placards 16, 18 may have a foldable crease (not shown) about a quarter inch up from its connection with the main placard 12. This would enable the side placards 16, 18 to bend until it is flush against the main placard 12, and to extend outward until it is perpendicular to the main placard 12. In some aspects, the side placards 16, 18 may be configured to move clockwise to flush against the main placard 12. Alternatively, the side placards 16, 18 may be configured to move anti-clockwise to flush against the main placard 12. Stated another way, the side placards 16, 18 may be configured to move in clockwise or anticlockwise direction to switch between the operational configuration and the non-operational configuration. In the operational configuration, the planes of the side placards 16, 18 may be perpendicular to the plane of the main placard 12. In the non-operational/folded configuration, the planes of the side placards 16, 18 may be parallel to the plane of the main placard 12. In the folded configuration, the side placards 16, 18 may lay on the surface of the main placard 12.

In further aspects, the grocery cart divider 10 may include an anchor strip 14 that may be configured to attach the main placard 12 and the side placards 16, 18 to a base (a surface on which the goods are placed) of the grocery cart 26. The anchor strip 14 may be located at a bottom portion of the main placard 12. The anchor strip 14 may run along a length (e.g., an entire length) of the main placard 12. In some aspects, the anchor strip 14 may include a recess at a top portion, which may extend along the entire length of the anchor strip 14. The recess may be configured to receive main placard 12. In some aspects, the anchor strip 14 may overlap about ¼ inch on each side and ¼ inch on front and back end.

In further aspects, the main placard 12 may be secured within the anchor strip 14 and may have a foldable crease or seam 24 about ¼ inch up from the anchor strip 14. Such foldable crease 24 may allow or enable the main placard 12 to lay flat in the folded configuration on the surface of the grocery cart 26. The folded configuration of the grocery cart divider 10 is depicted in FIG. 5. Stated another way, in the folded configuration, the side placards 16, 18 may fold on the main placard 12, and the main placard 12 may move from a vertical position to a horizontal position while the anchor strip 14 remains in its initial position such that the main placard 12 lays flat on the surface of the grocery cart 26. Thus, in the folded configuration, the planes of the main placard 12 and the side placards 16, 18 may be parallel to the surface (or base) of the grocery cart 26, and in the operational configuration, the planes of the main placard 12 and the side placards 16, 18 may be perpendicular to the surface (or base) of the grocery cart 26. In some aspects, the anchor strip 14 may remain in the fixed or same position (and may not move/turn) in the operational configuration and the folded configuration. The main placard 12 and the side placards 16, 18 may move/turn in both the configurations.

In further aspects, the grocery cart divider 10 may include installation clips or anchor clips 20, 22 that may be configured to attach/install the grocery cart divider 10 inside the grocery cart 26. The installation clips 20, 22 may prevent movement of the grocery cart divider 10 in the grocery cart 26. The installation clips 20, 22 may be located at a bottom portion of the main placard 12 (or the anchor strip 14) and the side placards 16, 18. In some aspects, the grocery cart divider 10 may include four installation clips, two installation clips 20 may be located at two opposite edges of the anchor strip 14 (e.g., at the bottom portion of the two edges of the anchor strip 14), and the other two installation clips 22 may be located at the bottom portion of the side placards 16, 18 (e.g., at the two opposite edges of the side placards 16, 18). In some aspects, the installation clips 20, 22 may remain in the fixed or same position (and may not move/turn) in the operational configuration and the folded configuration.

The installation clips 20, 22 may be plastic rings or clips having a slit (or opening) to enable the installation clip 20, 22 to removably attach or detach the grocery cart divider 10 from the grocery cart 26. In other embodiments, the installation clips 20, 22 may be made of metal. The installation clips 20, 22 may be of any size. For example, the installation clips 20, 22 may be ½ inch in height and 1 inch in length.

In operation, when the user desires to use the grocery cart divider 10, the user may simply move the main placard 12 from the horizontal to vertical position (i.e., in the operational configuration position). In addition, the user may move the side placards 16, 18 in the clockwise/anti-clockwise direction such that the side placards 16, 18 may be perpendicular to the main placard 12 (at the midpoint of the main placard 12), to create four quadrants in the internal portion of the grocery cart 26. The user may then store the items separately in each quadrant. When the user does not desire to divide the internal portion of the grocery cart 26, the user may fold the side placards 16, 18 and the main placard 12 to move to the non-operational configuration, as described above.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

The claimed invention is:

1. A cart divider comprising:
a main placard configured to divide an internal portion of a cart in a longitudinal direction;
one or more side placards configured to divide the internal portion of the cart in a lateral direction, wherein the one or more side placards are disposed at a midpoint of the main placard, and wherein the main placard and the one or more side placards are configured to divide the internal portion of the cart into four quadrants; and
installation clips configured to attach at least one of the main placard and the one or more side placards to the cart.

2. The cart divider of claim 1, wherein the cart divider is configured to move between an operational configuration and a non-operational configuration.

6

3. The cart divider of claim 2, wherein planes of the one or more side placards are perpendicular to a plane of the main placard in the operational configuration.

4. The cart divider of claim 2, wherein planes of the one or more side placards are parallel to a plane of the main placard in the non-operational configuration.

5. The cart divider of claim 2, wherein a plane of the main placard is perpendicular to a plane of a base of the cart in the operational configuration.

6. The cart divider of claim 2, wherein a plane of the main placard is parallel to a plane of a base of the cart in the non-operational configuration.

7. The cart divider of claim 1, further comprising an anchor strip configured to attach the main placard and the one or more side placards to the cart.

8. The cart divider of claim 7, wherein the anchor strip is located at a bottom portion of the main placard.

9. A cart divider comprising:
a main placard configured to divide an internal portion of a cart in a longitudinal direction;
one or more side placards configured to divide the internal portion of the cart in a lateral direction, wherein the one or more side placards are disposed at a midpoint of the main placard, and wherein the main placard and the one or more side placards are configured to divide the internal portion of the cart into four quadrants; and
an anchor strip configured to attach the main placard and the one or more side placards to the cart, wherein the anchor strip is located at a bottom portion of the main placard.

* * * * *